PRIOR ART

INVENTOR.
AKIRA KAMOI
MASAKAZU EJIRI

BY Paul M. Craig, Jr.
ATTORNEY

INVENTORS
AKIRA KAMOI
MASAKAZU EJIRI
BY Paul M. Craig, Jr.
ATTORNEY

INVENTORS
AKIRA KAMOI
MASAKAZU EJIRI

BY Paul M. Craig, Jr.
ATTORNEY

| | α | β | γ | δ | ε |
|---|---|---|---|---|---|
| $a_0$ = | 0 | 0 | 0 | 1 | 1 |
| $a_1$ = | 0 | 0 | 1 | 1 | 0 |
| $a_2$ = | 0 | 1 | 0 | 1 | 0 |
| $a_3$ = | 1 | 1 | 0 | 0 | 0 |
| $a_4$ = | 0 | 1 | 1 | 0 | 0 |
| $a_5$ = | 0 | 1 | 0 | 0 | 1 |

INVENTORS
AKIRA KAMOI
MASAKAZU EJIRI

BY Paul M. Craig, Jr.
ATTORNEY

INVENTORS
AKIRA KAMOI
MASAKAZU EJIRI

BY Paul M. Craig, Jr.
ATTORNEY

INVENTORS
AKIRA KAMOI
MASAKAZU EJIRI

BY Paul M. Craig, Jr.
ATTORNEY

United States Patent Office
3,484,780
Patented Dec. 16, 1969

3,484,780

ANALOG-TO-DIGITAL SIGNAL CONVERTER INCLUDING CODER PLATE DEVICE AND LOGIC CIRCUITRY

Akira Kamoi, Musashino-shi, and Masakazu Ejiri, Hachioji-shi, Japan, assignors to Hitachi, Ltd., Tokyo, Japan, a corporation of Japan Filed May 24, 1966, Ser. No. 552,591
Claims priority, application Japan, May 25, 1965, 40/30,739, 40/30,740; May 28, 1965, 40/31,095
Int. Cl. G08b *1/08*
U.S. Cl. 340—347 3 Claims

ABSTRACT OF THE DISCLOSURE

A device for analog to digital signal conversion which comprises a coder plate having tracks the number of which is less than the number of bits in each digital signal corresponding to the analog signal to be converted, means for sensing out at least two different coded signals from each of said tracks or said coder plate at respective points corresponding to the analog signal, and logic circuit means for determining a digital signal corresponding to a coded signal sensed out from the coder plate device.

This invention relates to devices for analog-to-digital signal conversion.

Various devices have heretofore been proposed for conversion of analog signals, such as represented by rectilinear and angular displacements, into digital signals. One type of such device employs a combination of a coder plate and sensing brush means to transform an analog signal representing the magnitude of rectilinear or angular displacement into a coded signal including a number of bits, which is converted into a specified code. A modification of this type of analog-to-digital converter employs so-called V-brush sensing means.

These and other conventional analog-to-digital converters, however, have involved various disadvantages and the present invention has for its object to provide a new and improved analog-to-digital converter which overcomes the disadvantages previously encountered by employing a novel code pattern on the coder plate based upon a theory corresponding to an extension of the so-called Gray code system.

Other objects as well as advantages and features of the present invention will become apparent from the following detailed description when taken in conjunction with the accompanying drawings, in which:

FIGS. 1, 2 and 3 diagrammatically illustrate respective previous forms of coder plate;

Figure 11:
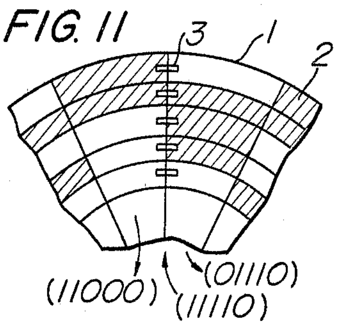
Figure 12A:
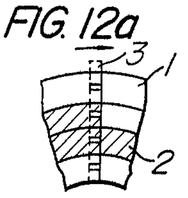
Figure 12B:
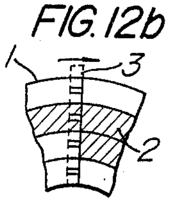
Figure 13A:
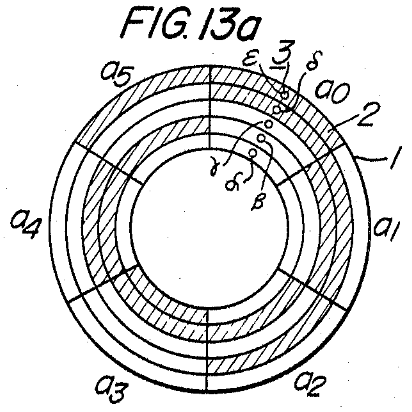
Figure 13B:
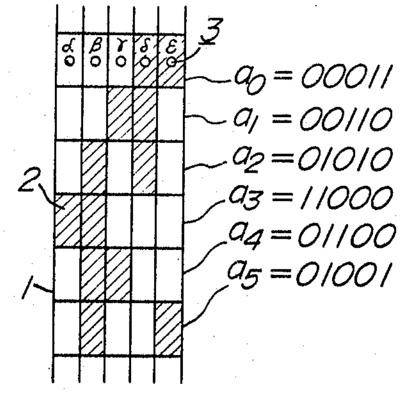
Figure 15:
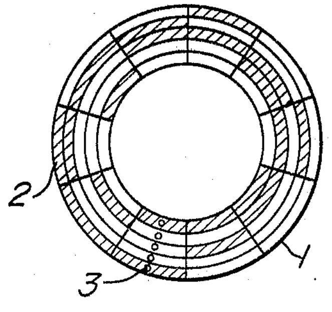
Figure 16:
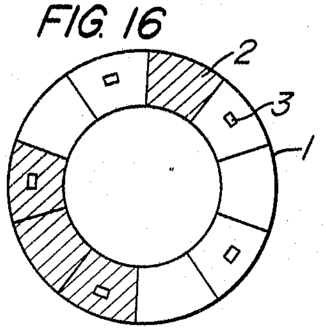
Figure 17:
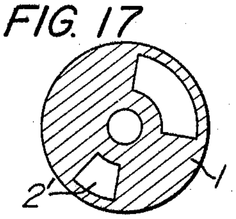
Figure 18:
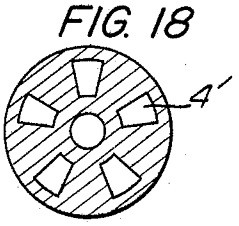
Figure 14:
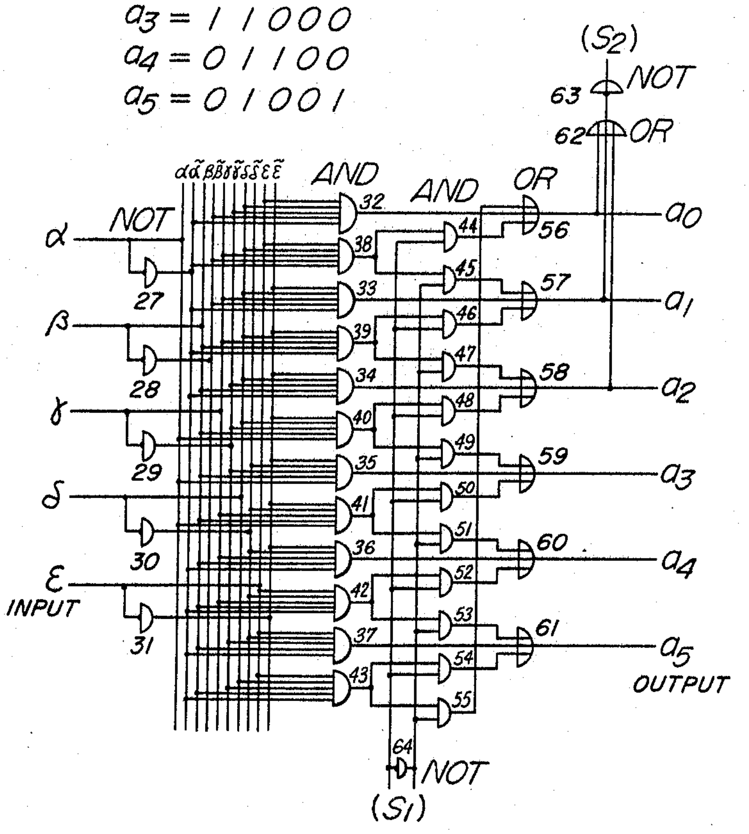
Figure 21:
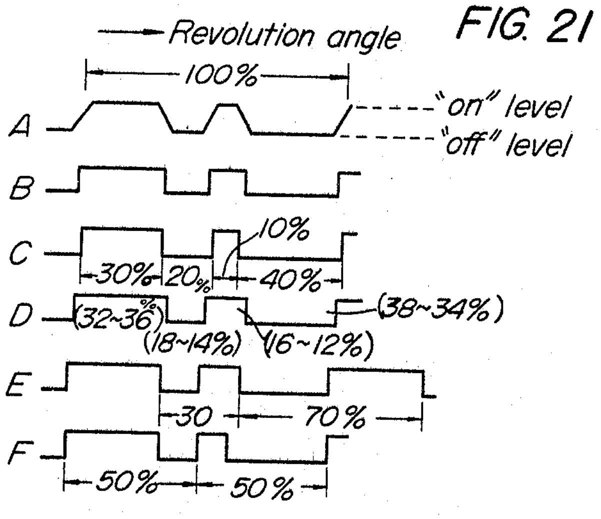
Figure 22:
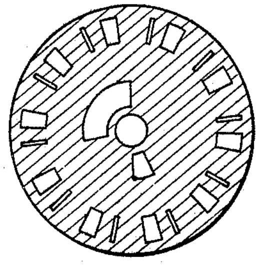
Figure 19:
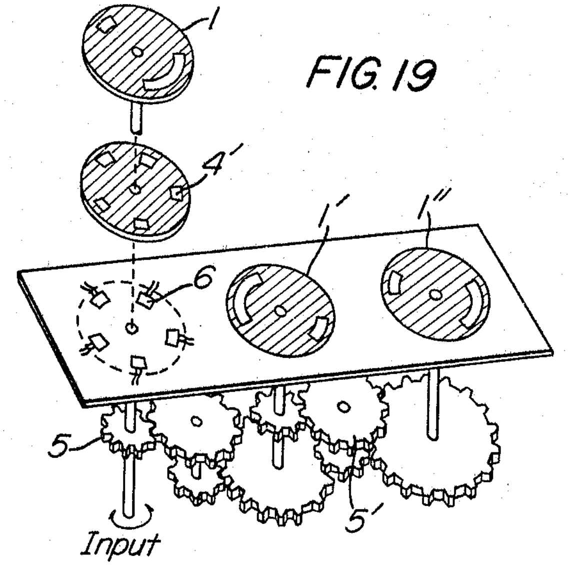
Figure 23:
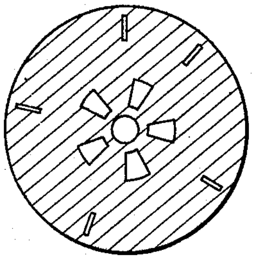
Figure 20:
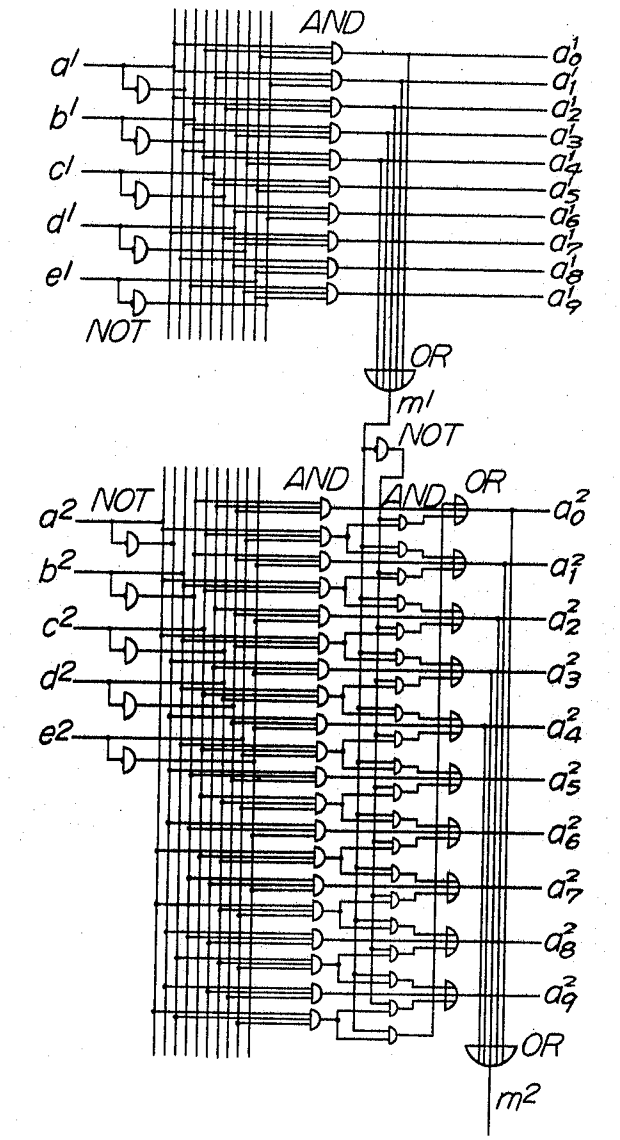

FIGS. 11, 12*a* and 12*b* are fragmentary diagrams drawn to illustrate the operating principles of the inventive device;

FIGS. 13*a* and 13*b* illustrate another form of coder plate usable in the inventive device;

FIG. 14 illustrates a logic circuit usable with the coder plate shown in FIG. 13;

FIG. 15 illustrates a further form of coder plate according to the present invention;

FIG. 16 illustrates yet another form of coder plate according to the present invention;

FIG. 17 illustrates one form of coder plate usable in the inventive device shown in FIG. 19;

FIG. 18 illustrates another form of coder plate usable in the device of FIG. 19;

FIG. 19 is a perspective representation of the essential part of an optical converter system embodying the present invention;

FIG. 20 illustrates part of the logic circuit for the device shown in FIG. 19;

FIG. 21 is an operation diagram of the device shown in FIGS. 19 and 20;

FIG. 22 illustrates another form of coder plate usable in the device of FIGS. 19 to 21; and FIG. 23 illustrates yet another form of coder plate usable in the device of FIGS. 19 to 21.

Before proceeding to the description of the present invention, description will first be briefly made on some forms of previous analog-to-digital converters with reference to FIGS. 1, 2, 3 and 4.

Figure 1:
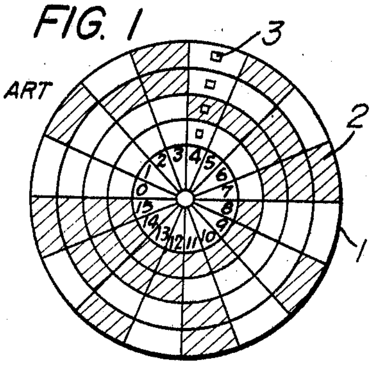
FIG. 1 PRIOR ART

In FIG. 1, there is shown one form of such previous converter which converts an analog information representing angular displacement into a coded signal, which takes the form of a binary 4-bit code. In this illustration, reference numeral 1 indicates a coder plate with 15 sectors 2. The darkened or hatched areas of the coder plate represent conductive segments which represent a logical "1" and the light areas represent insulated segments representing a "0" of the binary notation. The sectors 2 carry respective code patterns of 4-bit binary coded decimal notation representing the respective values of 0 to 15, which correspond to respective angles of rotation of the coder plate 1. Reference numeral 3 indicates brushes arranged for sliding engagement with the respective bands or tracks on the coder plate 1.

In this example, the tracks on the coder plate correspond each to one of the 4-bits of the binary code and thus the number of tracks is equal to that of code bits. If it is desired to increase the number of bits in the binary code for the same outer diameter of the coder plate, the assigned width of each track must be reduced and this makes it necessary to raise the accuracy with which the brushes are arranged or to reduce their size. On the other hand, the use of a larger track width will involve the inconvenience that the resulting increased sum of the widths of all the tracks makes larger the outer dimensions of the analog-to-digital converter. This undesirably increases the inertia of the coder plates of the rotary type and, in cases of the rectilinear type of coder plates, that region of the coder plate which supports the brushes must have an undesirably large width.

Figure 3:
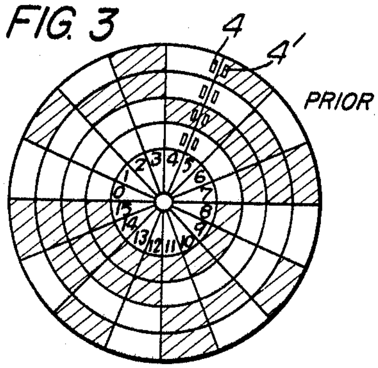
FIG. 3 PRIOR ART
Figure 2:
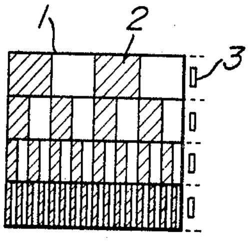

Also, with such coder plates, any slight dislocation of the brush means may cause a substantial error or ambiguous sensing. To avoid this, the so-called V-brush method has ordinarily been employed, for example, as illustrated in FIG. 3. The binary coder plate shown is provided with two brushes 4 and 4′ per bit for each track or bit position. With this arrangement, one of the two outputs from the brush means of a coder plate is selected according to whether the brush output obtained from another coder plate of the next lower place represents a logical "1" or "0," and in this manner the adverse effect of any dislocation of the brush means can be avoided.

Figure 4:
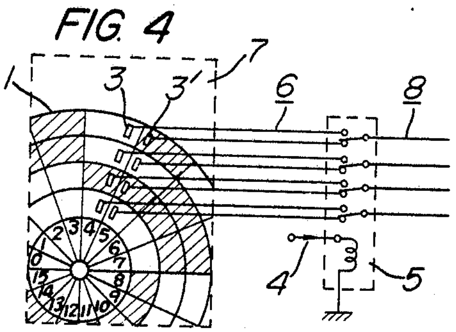
PRIOR ART FIG. 4
FIG. 4 is a schematic diagram illustrating the V-brush method used with the coder plate shown in FIG. 3.

In the V-brush method, it must be decided which of the two signals obtained through the two sets of brushes should be selected, when the coder signal is changed, by means of a signal from the lower order stage, as indicated at 4 in FIG. 4. The circuit or device 5 for such signal selection may be arranged in the receiver side but in this case, eight signal lines 6 are required for each place for signal transmission. The number of signal lines may be reduced to four by incorporating the selecting circuit or device 5 in the converter.

The Gray code system is known as a system which does not make use of V-brush means for signal transmission in any one place. In this code system, code arrangement is such that any two adjacent codes differ in their representation in only one bit position and, as the output signal is not of the binary notation form in the usual sense, it is transformed into a desired code by a logical process on the receiver side. In addition, even with this code system, in case two or more coder plates are used with interconnecting gear means to form a multiple-stage coder, use of V-brushes is required for any higher stage coder plate. In connection with the above discussions, reference may be made, for example, to "Notes on Analog-Digital Conversion Techniques," by A. K. Susskind, Technology Press, 1957, Chapter VI–E.

The present invention provides a device for analog-to-digital signal conversion which comprises a coder plate having tracks the number of which is less than the number of bits in each digital signal corresponding to the analog signal to be converted, means for sensing out at least two different coded signals from each of said tracks or said coder plate at respective points corresponding to the analog signal, and means for forming said digital signal from one of said coded signals.

The present invention also provides a device for analog-to-digital signal conversion which comprises a coder plate for each place in the *m*-coded number and carrying *m* different *n*-bit codes as main codes corresponding to the respective digits in the *m*-coded number, means for sensing out different coded signals from said coder plate for each analog signal, means for forming from said coded signals said main codes and *m* different sub-codes including *n*-bits each corresponding to the bitwise-OR of the bits of the two adjacent main codes in the same bit position and distinguishable from each of said main codes, and means for giving an output digital signal which corresponds to that digit of the *m*-coded number represented by any one of said main codes when the latter is sensed out as a coded signal and for selecting one of any two adjacent main codes, when the sub-code therebetween is sensed out as a coded signal, by means of a carry signal from the next lower place to give an output digital signal which corresponds to that digit of the *m*-coded number represented by the main code selected.

The present invention further provides an analog-to-digital signal conversion which comprises a coder plate for each place of decimal numbers and carrying 2-out-of-5 codes corresponding to the respective decimal digits in an arrangement to form a set of five tracks each including those bits of said 2-out-of-5 codes aligned in the same bit position, means for sensing out different coded signals from said coder plate for each analog signal to be converted, means for forming from said coded signals said 2-out-of-5 codes and 3-out-of-5 codes including bits each corresponding to the bitwise-OR of the bits of the two adjacent 2-out-of-5 codes in the same bit position, and means for giving an output digital signal which corresponds to the decimal digit represented by any one of said 2-out-of-5 codes when the latter is sensed out as a coded signal and for selecting one of any two adjacent 2-out-of-5 codes when the 3-out-of-5 code therebetween is sensed out as a coded signal by means of a carry signal from the next lower place to give an output digital signal which corresponds to the decimal digit represented by the 2-out-of-5 code selected.

The present invention further provides an analog-to-digital signal converter which comprises a novel coder plate device and a logic circuit device for determining a digital signal corresponding to a coded signal sensed out from the coder plate device.

The present invention will next be described in detail with reference to the accompanying drawings.

Figure 5:
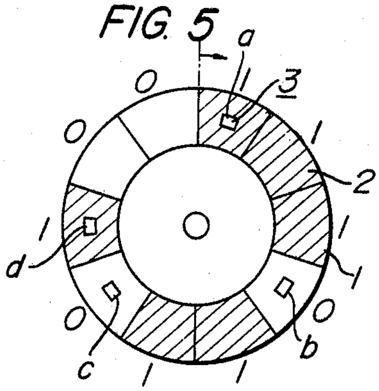
FIG. 5 illustrates one form of coder plate usable in the device according to the present invention.

Referring first to FIG. 5, there is shown a coder plate 1 embodying the principle of the present invention. The coder plate 1 includes a pattern of conductive regions 2 and an arrangement of sensing brush device 3 composed of four brushes. *a*, *b*, *c* and *d*. In the position shown, a digitalized signal taken through the brushes represents a binary code of 1001. When the coder plate 1 is rotated clockwise by an angle corresponding to one bit, the brushes come to produce a coded signal 0110. As such clockwise rotation of the coder plate is repeated, the following ten different codes are successively obtained from said respective brushes: 1001, 0110, 0111, 1101, 0010, 1011, 1111, 0001, 1100 and 1110. Accordingly, if these codes are predetermined to correspond to the respective decimal digits, the respective codes are obtaind in response to the rotation angles of the coder plate 1, i.e., analog signals. In this manner an analog to decimal notation can be realized with ease.

Figure 6:
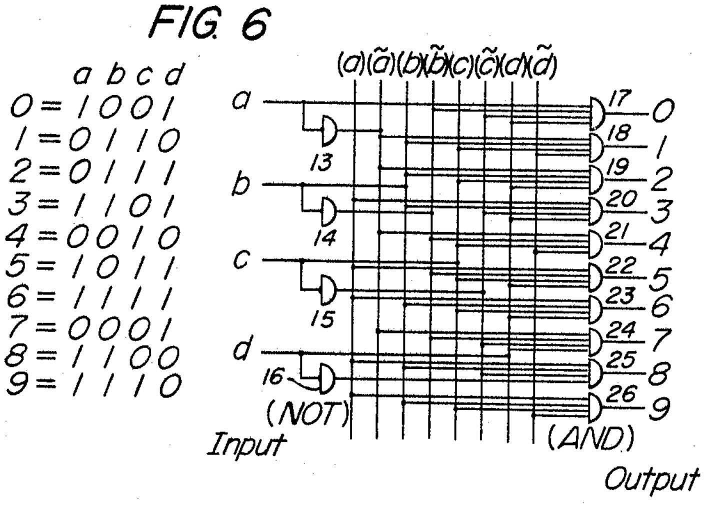
FIG. 6 illustrates one form of logic circuit usable in the inventive device.

Referring to FIG. 6 there is shown a logic circuit for determining decimal digits corresponding to said respective codes which are sensed out from the coder plate 1 by said respective brushes. In this case, the relations between the respective codes and the decimal digits are predetermined, for example, as: 0=1001, 1=0110, 2=0111, 3=1101, 4=0010, 5=1011, 6=1111, 7=0001, 8=1100, 9=1110.

Accordingly, for example, if the output "1" of the brush *a* is "*a*" and "0" corresponding to the absence of output thereof is "$\tilde{a}$", decimal digits can also be expressed as logical products of predetermined combinations which are constituted by numerals of said respective brushes, namely, $0=\tilde{a}b\tilde{c}d$, $1=\tilde{a}bc\tilde{d}$, $2=\tilde{a}bcd$, $3=ab\tilde{c}d$, $4=\tilde{a}\tilde{b}c\tilde{d}$, $5=a\tilde{b}cd$, $6=abcd$, $7=\tilde{a}\tilde{b}\tilde{c}d$, $8=ab\tilde{c}\tilde{d}$, and $9=ab\tilde{c}\tilde{d}$.

In the circuit shown in FIG. 6, the outputs of the brushes *a*, *b*, *c*, and *d* are connected to four inputs respectively, to which NOT circuits 13, 14, 15, and 16 are connected in series, respectively. Thus, from said respective inputs and the outputs of the NOT circuits all the numerals, *a*, *b*, *c* and *d*, and $\tilde{a}$, $\tilde{b}$, $\tilde{c}$, and $\tilde{d}$ can be obtained. By constituting AND circuits 17 through 26 so as to produce said logical products composed of these numerals, said analog to digital signal converter can be provided.

As will be appreciated from the above description, analog-to-digital signal converters can be fabricated according to the present invention which employ coder plates having tracks the number of which is less than the number of bits in the desired digitalized signal. It is to be noted that such converter system is characterized in that the coded signals sensed out from any of the tracks on the coder plate include unweighted bits as distinct from those weighted, for example, such as 1, 2, 4 and 8 obtainable with conventional coder plates.

As will be readily understood, any variety of digital converter system can be realized in the same manner as in the example shown in FIG. 5. Listed below is one example of a combination of a pattern of conductor arrangement on the coder plate and a brush arrangement therefor, for each of the number systems, from ternary notation to decimal notation. For convenience of disclosure, the brush arrangement and the code pattern on the coder plates are shown here in binary coded form. For example, the conductor pattern on the coder plate shown in FIG. 5 is expressed in the form of *p*(1110110100), starting clockwise from the arrowed radial position and the brush arrangement in FIG. 5 in the form of $b$(1001001100).

verters or those of the photoelectric type employing solar cells and detectors the output of which is proportional to the light-receiving area.

| $p$(110) $b$(110) | $p$(1100) $b$(1100) | $p$(11000) $b$(11100) | $p$(111000) $b$(101010) | $p$(1110100) $b$(1010100) | $p$(11100100) $b$(11000100) | $p$(111010100) $b$(101010100) | $p$(1110010000) $b$(1010101000) |
|---|---|---|---|---|---|---|---|
| 11 | 11 | 110 | 110 | 111 | 111 | 1111 | 1100 |
| 01 | 01 | 011 | 010 | 010 | 010 | 0100 | 0101 |
| 10 | 00 | 001 | 011 | 011 | 000 | 0111 | 0110 |
| | 10 | 000 | 001 | 101 | 101 | 1010 | 0010 |
| | | 100 | 101 | 001 | 011 | 0011 | 0011 |
| | | | 100 | 110 | 001 | 1101 | 1001 |
| | | | | 100 | 100 | 0001 | 0001 |
| | | | | | 110 | 1110 | 0100 |
| | | | | | | 1000 | 1000 |
| | | | | | | | 1010 |
| Ternary notation | Quaternary notation | Quintary notation | Sextary notation | Septimal notation | Octal notation | Nonary notation | Decimal notation |

In these examples, the number of bits is reduced to the minimum but may be increased if desired. For example, in the pattern of brush arrangement $b$ for the sextary notation, any one of "0" bits may be replaced by a "1" bit, which implies use of an additional brush. If the last "0" bit is replaced by "1," the code pattern of the coder plate and the brush arrangement are changed as follows, giving an output coded to the sextary notation:

$$p=111000$$
$$b=101011$$

1100, 0100, 0110, 0011, 1011 and 1001. Obviously, many other modifications can be made as desired. For another example, use of an additional brush with the decimal coder plate to change the brush arrangement to $b$(10101010) gives the following coded output:

$$p=1110010000$$
$$b=1010101010$$

11000, 01010, 01100, 00101, 00110, 10010, 00011, 01001, 10001, and 10100.

This digital representation of the output forms a kind of 2-out-of-5 code, as will readily be noted.

In this manner, a coder for any desired notation can be realized by arranging a plurality of brushes along a single track on the coder plate. This coder principle may be extended in practical applications as will be described below.

Figure 7:
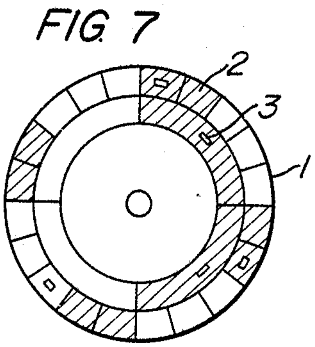
FIG. 7 illustrates another form of coder plate usable in the present invention.

Referring to FIG. 7, the coder plate 1 shown therein includes two concentric tracks. The inner track has a conductor arrangement for the quaternary notation while the outer track includes a quintary notation repeating itself four times, once for each of the four segments of the inner quaternary track. The inner and outer tracks together form a code pattern of a 20(4×5)-coded notation. With this arrangement, since in the outer quintary track the same pattern appears four times, the brushes on the coder plate can be properly dispersed or spaced apart from each other, for example, as shown, eliminating the disadvantage of close arrangement of brushes in a limited region. As will be readily noted, the coder plate of FIG. 7, including only two tracks, in effect forms a 20-coded notation, 5-bit digital converter. By analogy with this example, it will be recognized that, according to the present invention, a coder plate for code conversion can be fabricated by employing a plurality of tracks the number of which is less than that of bits included in the coded output. This means that the coder has among other features a practical advantage that the tracks can be formed with an increased width or the coder plate itself may be reduced in size.

Though, in the above description, coder plates of the type including conductive segments and sensing brushes have been described and shown, it should be understood that the invention is not to be restricted to the type of coder plate but is also applicable to photoelectric, electromagnetic and other different sensing systems. The feature of the present invention that it facilitates fabrication of coder plates carrying tracks of an increased width is highly advantageous in making electromagnetic type converters or those of the photoelectric type employing solar cells and detectors the output of which is proportional to the light-receiving area.

Figure 8:
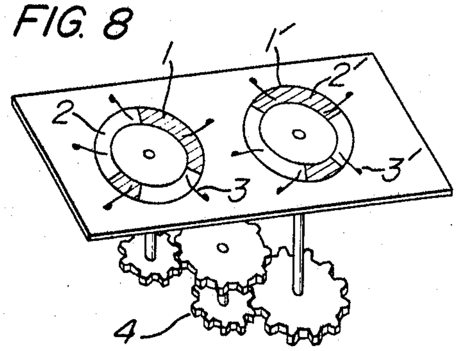
FIG. 8 is a schematic perspective view of one embodiment of the present invention, showing a pair of coder plates coupled by gear means.

Though description has been made hereinbefore on those devices including a single coder plate, the principles of the present invention are also readily applicable to other forms of converter, for example, those employing a plurality of coder plates with interconnecting gear means. Shown in FIG. 8 is a coder including two coder plates 1 and 1′ with the interconnecting reduction gear means 4 of the continuous type. This coder or any other coder employing coder plates interconnected by intermittent reduction gear means can be employed to form converters of a higher-coded notation by use of ordinary V-brushes or equivalent electronic circuits. It is one of the important advantages of the present invention that it can be freely expanded or modified to suit any particular application.

Figure 9:
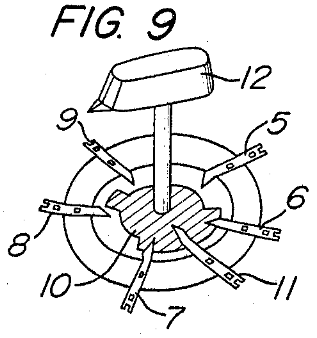
FIG. 9 is a view similar to FIG. 8, illustrating another embodiment of the invention.

Further, rotary switches, which are designed to stop at a number of predetermined different angular positions, can be regarded as a kind of analog-to-digital signal converter in cases where it is designed to produce coded signals at the respective angular positions. Shown in FIG. 9 is a rotary switch which includes fixed contact pieces 5, 6, 7, 8 and 9 as a modification of brush means as used in the above examples and a slider disc 10 having radial projections for contacting engagement with the fixed contact pieces and in effect forming an extension of the conductor arrangement. It will be readily understood that the same principles of the brush and conductor arrangement described hereinbefore can be applied to rotary switches properly designed, for example, as shown in FIG. 9. Reference numeral 11 in FIG. 9 indicates a brush element for conducting current to the slider 10 and reference numeral 12 indicates a finger grip for turning the slider.

Examining the function of V-brushes from another point of view, they can be regarded as functioning to select one of the two adjacent codes in the place concerned according to a signal coming from the next lower place, and, when required, can be arranged to produce such a selecting signal for the next higher place. This function is in effect very similar to "rounding" or the process of discarding superfluous figures in numerical computation in the decimal notation, as will be explained below in detail.

Figure 10:
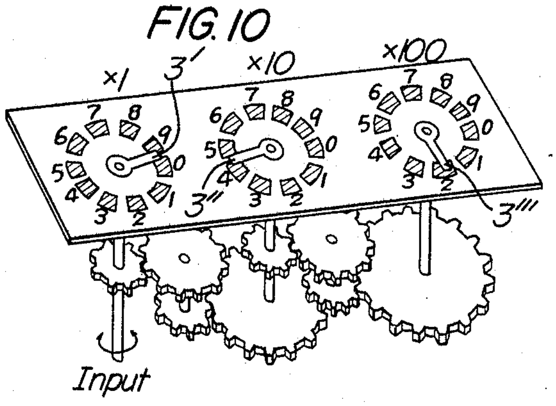
FIG. 10 is a view similar to FIGS. 8 and 9, illustrating one example of conventional analog-to-digital converter.

In FIG. 10 is shown an analog-to-digital signal converter in the decimal notation for convenience of disclosure. As will be apparent from examining the mechanics of the converter of FIG. 10, when the number in one place of decimal notation is in transition from 9 to 0 or from 0 to 9, as indicated at 3′, the number in the next higher place is increasing or decreasing by 1. Also, when the number in a certain place changes from 4 to 5, as indicated at 3″, the number in the next higher place remains unchanged, the brush in the coder stage remaining in contact with a particular conductive segment representing the decimal number, as indicated at 3‴. The moment of transition of the number in a place from 9 to 0 or from 0 to 9 can conveniently be called a carrying time.

Further, the two digits 0 and 9 in any place can be regarded as two adjacent numbers, 0 being larger than 9. Also, in the decimal notation, the moment the remotest from the carrying time when the number changes between 4 and 5. Thus, in the V-brush system, it will be understood that the positioning of the V-brush in any decimal place at 0, 1, 2, 3, 4 or at 5, 6, 7, 8, 9 determines the brush element to be selected in the next higher place. Namely, if the brush output in any decimal place includes two signals representing different numbers, one of the signals representing the larger number should be selected for the next higher place if the number in the place concerned is 0, 1, 2, 3 or 4 and the other signal should be selected if the number in the place concerned is 5, 6, 7, 8 or 9. Since any two number signals are not given at the time of the number change between 4 and 5, as already observed from mechanical examination, the above selecting function is effective upon the number change only when the number in the next lower place is in transition between 0 and 9. It will be obvious that such function is similar to the "rounding" process in numerical computation but is opposite thereto in the direction of processing.

In generalizing the analysis of the V-brush function made above, consideration will next be given to the coding of $m$-coded notation employing $n$-bit signals. Of course, $m$ and $n$ represent positive integers not less than 2 and $2^n \geq m$.

Assume that an $n$-bit code (00 . . . 100) corresponds to a digit number $i$ $(0 \leq i < m)$ in the $m$-coded notation. Accordingly, the code pattern $a_i$ formed to produce the coded signal is expressed as follows:

$$a_i = (00 \ldots 100)$$

Since the $m$ codes are different from each other, the following condition must be satisfied.

$$a_i \neq a_j \quad (i \neq j,\ 0 \leq i < m,\ 0 \leq j < m) \qquad (1)$$

The $m$ codes are referred to herein as main codes and the corresponding patterns on the coder plate as main patterns.

Such code system inherently involves a difficulty described below. That is, however accurately the patterns $a_i$ and $a_{i+1}$ be made (if the suffix $(i+1)$ exceeds $m$, it is to be construed as the number obtainable by subtracting $m$ from $(i+1)$ and lying between 0 and $(m-1)$), any brush crossing the boundary between $a_i$ to $a_{i+1}$ cannot be shifted from $a_i$ to $a_{i+1}$ perfectly at the specified moment because of the width of the brush. This difficulty can be avoided by the following system based upon the above interpretation made of the functioning of V-brushes.

According to this system, arrangement is made so that any coder stage when the next lower place is generating a carry produces an output including signals representing two adjacent digits or numbers, respectively, leaving the function of selecting either one of the two signals to a discriminating circuit provided for the purpose, and, when the next lower place is the remotest from the carry time produces only one signal representing a particular number. As will be noted, this arrangement necessitates another coded signal between the two signals $a_i$ and $a_{i+1}$. This additional signal is expressed herein in the general form of $a_{i+1/2}$, the one intervening between $a_{m-1}$ and $a_0$, being expressed in the form of $a_{m-1+1/2}$. As is apparent from FIG. 11, which is an enlarged view of one of the transition regions between the code patterns, it is most convenient to form the intervening signal, $a_{i+1/2}$, as the bitwise-OR of the two codes $a_i$ and $a_{i+1}$. Let the symbol $\oplus$ express the bitwise-OR function. Then $$a_i \oplus a_{i+1} = a_{i+1/2} \qquad (2)$$

For example, in cases of 5-bit codes, the intervening code is formed as follows:

| | | | | | |
|---|---|---|---|---|---|
| $a_i=$ | 1 | 1 | 0 | 0 | 0 |
| $a_{i+1}=$ | 0 | 1 | 1 | 1 | 0 |
| $a_{i+1/2}=$ | 1 | 1 | 1 | 1 | 0 |

In this case, $a_{i+1/2}$ is also in the form of a 5-bit code. In order that the code $a_{i+1/2}$ can be separated by logical operation, it must take $m$ forms differing from each other and from any of the main codes as follows: These intervening codes will be referred to herein as sub-codes.

$$a_{i+1/2} \neq a_{j+1/2},\ (i \neq j)$$

$$a_i \neq a_{j+1/2},\ (i,\ i\text{: arbitrary}) \qquad (3)$$

Now assume that two or more of the "0" bits in $a_i$ are changed to "1" in $a_{i+1}$. In such cases, there is a possibility that one of the "1" bits in $a_{i+1}$ comes in contact with the brush earlier than the other "1" bit or bits. The code formed at this instant can generally be expressed as follows:

$$a_i \oplus \tilde{a}_{i+1}$$

where $\tilde{a}_{i+1}$ represents any code formed by changing some of the "1" bits in $a_{i+1}$ to "0." The code of the general form can be formed only when $a_{i+1}$ is being approached from $a_i$. Therefore, no trouble occurs as long as the code thus formed in the same as $a_i$ or $a_{i+1/2}$, that is:

$$a_i \oplus \tilde{a}_{i+1} = a_i \text{ or } a_{i+1/2} \qquad (4)$$

Similarly, in case the brushes move in the opposite direction, the condition is expressed as follows:

$$\tilde{a}_i \oplus a_{i+1} = a_{i+1/2} \text{ or } a_{i+1} \qquad (5)$$

Also, in this code system, since it includes $n$-bit code patterns, $2m$ in number, as observed from the Formula 3, $$2^n \geq 2m \qquad (1')$$

It will thus be noted that the signal output of any place of the $m$-coded notation device includes only one main or sub-code. When a main code is produced, the true output of the place represents the digit or number corresponding to the main code. When a sub-code is generated, the true output represents either of the two digits corresponding to the two main codes adjacent to the sub-code, depending upon whether the true output in the next lower place represents one of $m$ digits including 0, 1 . . .

$$\left[\frac{m-1}{2}\right]$$

or one of $m$ digits from $$\left[\frac{m+1}{2}\right]$$

to $[m-1]$. In other words, the true output of the coder plate represents $i$: if its coded output is $a_i$ $i+1$: if the coded output is $a_{i+1/2}$ and the true output in the next lower place is 0, 1, . . . or $$\left[\frac{m-1}{2}\right]$$

and $i$: if the coded output is $a_{i+1/2}$ and the true output in the next lower place is $$\left[\frac{m+1}{2}\right]$$

or $[m-1]$. (6)

However, as for the least significant place, it is obvious that no carry signal can normally be given thereto because of the lack of any lower place.

Needless to say, it may be considered that a predetermined signal corresponding to the carry signal is given also to the least significant place.

Accordingly, the above conditions (6) for determining the true output are modified into the following two conditions. If the coded output of the coder plate and brush combination is $a_i$ or $a_{i+1/2}$, the true output can be determined by selecting $i+1$ (6′) or $i$ (6″) in accordance with the true output (carry signal) in the next lower place.

It will be appreciated, therefore, that the true output in any place can be readily determined by the use of an electronic circuitry designed to carry out the logical operations (6), (6′) and (6″).

Next, various features of the above-described system can be derived from the Formulae 1 to 5. Among others, the following features are of importance.

First, the main codes have all the same number of "1" bits and the number of "1" bits in the sub-codes is larger than that in the main codes by 1.

Secondly, any two adjacent main codes and the sub-code intervening therebetween take the following respective forms as long as these codes differ from each other only in the first two bit position.

$$a_i=(10{*}{*}{*}\ .\ .\ .\ {*})$$
$$a_{i+1/2}=(11{*}{*}{*}\ .\ .\ .\ {*})$$
$$a_{i+1}=(01{*}{*}{*}\ .\ .\ .\ {*})$$

In these expressions, * indicates that the codes have all the same bit "1" or "0" in the bit position. It will be noted from this feature that such main and sub-codes arranged alternately are in fact Gray codes. In the present invention, however, only the main codes are made use of to represent the respective digits in each place of a notation and thus the conditions for Gray codes are not satisfied. A more important difference of the inventive system from the Gray code system is that the brush width does not offer any critical problem at the time when the brushes shift from one position to another on the coder plate.

On the other hand, in the Gray code system, when the number of "1" bits in the coded output is reduced by 1 as the brushes 3 proceed in a direction, the bit change from "1" to "0" takes place along the rear edge of the associated brush, as observed in FIG. 12*a*. Similarly, when the number of "1" bits in the coded output is increased by 1 as the brushes 3 proceed in the same direction, the bit change takes place along the front edge of the associated brush, as observed in FIG. 12*b*. Assuming that the coder plate includes a pattern of code segments all of the same width or, if the coder is of the rotary type, of the same angular extent relative to the axis of rotation, the difference in time between the transitions increasing and decreasing the number of "1" bits corresponds to twice the brush width. This implies the necessity of taking account of the brush width in designing the pattern of the coder plate. This situation is undesirable in practical applications in view of the unavoidable wear of the brushes and their frequently required change. It is thus recognized that the thought of Gray codes lacks the idea of brush width.

In contrast, according to the present invention, the code change or transition takes place at all times along the same edge of the brushes independently of their width, as long as either one of the relationships 6′ and 6″ is continuously selected.

Moreover, according to the present invention, it will be apparent that the boundary regions between the main code patterns on the coder plate can be formed in any desired configuration while giving the same results. For example, the boundary regions may include within the range of the brush width areas carrying no code pattern or may themselves carry an appropriate pattern of sub-codes.

To summarize, the present invention is designed to convert analog information into one of the desired digital forms by effecting an analog-to-digital conversion by means of codes which satisfy the relationships 1′, 2, 3, 4 and 5 and effecting code conversion according to the relationships 6, 6′ and 6″.

In codes based on the aforementioned principles, there are, for example, 5 bit sextary codes as described below: $a_0=(00011)$, $a_1=(00110)$, $a_2=(01010)$, $a_3=(11000)$, $a_4=(01100)$, $a_5=(01001)$. Coder plates of the rotary and rectilinear types carrying these codes are schematically illustrated in FIGS. 13*a* and 13*b*, respectively.

A logical circuitry for determining sextary digits corresponding to said codes which will be sensed out from brushes $\alpha$, $\beta$, $\gamma$, $\delta$, and $\epsilon$ through the coder plates is illustrated in FIG. 14.

Also, in the logical circuit, as is obvious from the description of the logic circuit shown in FIG. 6, if the respective outputs of AND circuits 32 to 37 have "1" bit signals, this means that the main codes have been sensed out, where it can be considered that the respective brushes have sensed out the codes correctly.

However, if any of the brushes incorrectly sense out the codes, the respective outputs of said AND circuits do not establish "1" bit signals because sub-codes are sensed out as described above. Obviously from Formula 2, these sub-codes are sensed out as described above. Obviously from Formula 2, these sub-codes are expressed as:

$$a_{0+1/2}=(00111),\ a_{1+1/2}=(01110),\ a_{2+1/2}=(11010)$$
$$a_{3+1/2}=(11100),\ a_{4+1/2}=(01101)$$

and $a_{5+1/2}=(01011)$. These are also expressed in the form of logical products of predetermined combinations of brush numerals as described above:

$a_{0+1/2}=(\tilde{\alpha}\tilde{\beta}\gamma\delta\epsilon)$, $a_{1+1/2}=(\tilde{\alpha}\beta\gamma\delta\tilde{\epsilon})$, $a_{2+1/2}=(\tilde{\alpha}\beta\tilde{\gamma}\delta\epsilon)$, $a_{3+1/2}=(\alpha\beta\gamma\tilde{\delta}\tilde{\epsilon})$, $a_{4+1/2}=(\tilde{\alpha}\beta\gamma\tilde{\delta}\epsilon)$ and $a_{5+1/2}=(\tilde{\alpha}\beta\tilde{\gamma}\delta\epsilon)$.

Also, the main codes are given by:

$a_0=\tilde{\alpha}\tilde{\beta}\tilde{\gamma}\delta\epsilon$, $a_1=\tilde{\alpha}\tilde{\beta}\gamma\delta\tilde{\epsilon}$, $a_2=\tilde{\alpha}\beta\tilde{\gamma}\delta\tilde{\epsilon}$, $a_3=\alpha\beta\tilde{\gamma}\tilde{\delta}\tilde{\epsilon}$, $a_4=\tilde{\alpha}\beta\gamma\tilde{\delta}\tilde{\epsilon}$ and $a_5=\tilde{\alpha}\beta\tilde{\gamma}\tilde{\delta}\epsilon$.

If said sub-codes are sensed out, the outputs of AND circuits 38 to 43 establish "1" bit signals.

As described above, if the sub-codes are sensed out thereat, the true outputs of the corresponding places are to be determined by a carry signal $S_1$ coming from the next lower place and the respective sub-codes.

As is obvious from the above conditions 6, the true output in the next lower place 0, 1 . . . or $$\left[\frac{m-1}{2}\right] \text{ or } \left[\frac{m+1}{2}\right] . . .$$

or $[(m-1)]$ is employed as the carry signal $S_1$.

In this case, since $m=6$, the carry signal may be provided only when the true output in the next lower place is 0, 1, 2, or 3, 4, or 5. For example, in the embodiment of FIG. 14, the circuit is so constituted that the carry signal $S_1$ is provided when the true output in the next lower place is 3, 4, or 5 and the carry signal $S_1$ going to the next higher place is produced in the form of an inverted signal of the logical sum of outputs $a_0$, $a_1$ and $a_2$. In order to provide such inverted signal an OR signal 62 and a NOT circuit 63 are used in the circuit. This means that if the carry signal $S_2$ is "1" bit signal the true output in the corresponding place is 3, 4, or 5, while if the carry signal $S_2$ is "0" bit signal, i.e. if the inserted signal thereof is "1" bit signal, the true output therein is 0, 1, or 2. Thus, the carry signal S, is also produced in the same manner as in the carry signal $S_2$ in the next lower place ($S_2=a_0a_1a_2$).

AND circuits 44 to 55 provide the logical product of a sub-code signal and a carry signal $S_1$ or an inverted signal $S_1$ thereof which is established at the output of a NOT circuit 64, respectively, OR circuits 56 to 61 provide the logical sum of the thus produced logical products and the outputs (namely, the main codes) of the respective AND circuits 32 to 37. When a sub-code, for example, $a_{1+1/2}$ is established at the output of the AND circuit 39, the logical circuit is operated in such a manner that if $S_1$="1," $a_1$ is the true output, while if $\tilde{S}_1$="1," $a_2$ is the true input.

For this reason, $a_{1+1/2}$ is entered into each one of the inputs of the AND circuits 47 to 48, and $S_1$ and $S_1$ are applied to the other inputs thereof respectively, so that the AND circuits 47 and 48 establish the logical product, $a_{1+1/2}S_1$ and the logical product, $a_{1+1/2}\tilde{S}_1$ respectively.

Now, supposing that the true output of the corresponding place is, for example, $a_1$, the main code and either of the sub-codes, $a_{0+1/2}$ and $a_{1+1/2}$ correspond to $a_1$, and therefore, the logical sum of these codes can provide the true output. Other true outputs in the respective places are provided in the same manner. Thus, the outputs of the OR circuits 56 to 61 establish $a_4$, $a_1$, $a_2$, $a_3$, $a_4$, and $a_5$, respectively.

Having described primarily the general principles of the present invention, its application to decimal conversion will now be described in detail.

In this case, the minimum possible number of bits is five and thus a set of 5-bit codes for this case can be obtained as listed below.

| Digit | $\alpha$ | $\beta$ | $\gamma$ | $\delta$ | $v$ |
|---|---|---|---|---|---|
| $a_k$ | 0 | 0 | 0 | 1 | 1 |
| $a_{k+1l}$ | 0 | 0 | 1 | 0 | 1 |
| $a_{k+2l}$ | 0 | 1 | 1 | 0 | 0 |
| $a_{k+3l}$ | 1 | 0 | 1 | 0 | 0 |
| $a_{k+4l}$ | 1 | 0 | 0 | 0 | 1 |
| $a_{k+5l}$ | 1 | 0 | 0 | 1 | 0 |
| $a_{k+6l}$ | 0 | 0 | 1 | 1 | 0 |
| $a_{k+7l}$ | 0 | 1 | 0 | 1 | 0 |
| $a_{k+8l}$ | 1 | 1 | 0 | 0 | 0 |
| $a_{k+9l}$ | 0 | 1 | 0 | 0 | 1 |

In this table, the decimal digit represented by the code $a_k$ is not definitely fixed because of the following characters of this code system.

(a) The place of columns $\alpha$, $\beta$, $\gamma$, $\delta$ and $\epsilon$ may be changed freely, for example, to $\beta$, $\delta$, $\alpha$, $\epsilon$, $\gamma$ or $\delta$, $\alpha$, $\beta$, $\epsilon$, $\gamma$, and any such place of columns gives codes answering the same purpose.

(b) $k$ in the suffix to the code designation be any integer; that is, in assigning the decimal digits 0, 1, 2 . . . 9 to the main codes, we can start at any desired line of main code in the table.

(c) $l$ in the suffix to the code designation such as $a_{k+2l}$ can be either $+1$ or $-1$; that is, the decimal digits 0, 1, 2 . . . 9 can be assigned to the main codes in the table in either descending or ascending place.

(d) All of the five columns $\alpha$, $\beta$, $\gamma$, $\delta$ and $\epsilon$ include code bits of the same pattern, (1110010000), only differing in phase from each other by two bits.

Various sets of 2-out-of-5 codes have been known as decimal codes including two "1" bits, but such 2-out-of-5 codes when used to form the code pattern of a coder plate makes it necessary to employ mechanical V-brush means.

In contrast, any such V-brush means are not required with use of the set of codes listed in the above table, and it has been confirmed by computer operations that the listed set of codes represents any set of 5-bit decimal codes satisfying the conditions 1′, 2, 3, 4 and 5 of the present invention.

The character $d$ of the code set has no relationship with the conditions 1′, 2, 3, 4 and 5 but, as will readily be appreciated it makes it possible to fabricate one-track coder plates.

Further, the set of decimal codes can apparently be specified in various forms according to the combination of $k$ and $l$ while maintianing the characters mentioned above and now, for convenience in disclosure, the following correspondence between the codes and the decimal digits is assumed

| Digit | $\alpha$ | $\beta$ | $\gamma$ | $\delta$ | $\epsilon$ |
|---|---|---|---|---|---|
| $a_0$ | 1 | 0 | 0 | 0 | 1 |
| $a_1$ | 1 | 0 | 1 | 0 | 0 |
| $a_2$ | 1 | 1 | 0 | 0 | 0 |
| $a_3$ | 0 | 1 | 0 | 1 | 0 |
| $a_4$ | 0 | 1 | 1 | 0 | 0 |
| $a_5$ | 0 | 0 | 1 | 0 | 1 |
| $a_6$ | 0 | 0 | 1 | 1 | 0 |
| $a_7$ | 1 | 0 | 0 | 1 | |
| $a_8$ | 0 | 0 | 0 | 1 | 1 |
| $a_9$ | 0 | 1 | 0 | 0 | 1 |

This correspondence has a characteristic feature that it is utilizable for complement calculation as the code $$\tilde{\gamma}\tilde{\beta}\tilde{\epsilon}\tilde{\alpha}\tilde{\delta}$$

($\gamma$, etc. expressing the negation of $\gamma$, etc. respectively) represents a sub-code to intervene between the complements of the original digit to 10 and 9. Apparently, many other correspondences can be contemplated.

FIG. 15 illustrates a coder plate of conventional make carrying the set of 5-bit decimal codes in the above table. Each track on the plate includes bits in one column in the table, that is, corresponds to one bit position of the output signals.

According, however, to the above character $d$ of the code system, the five tracks on the coder plate are all the same. It follows, therefore, the number of tracks can be reduced to one by appropriately distributing the brushes circumferentially, as illustrated in FIG. 16. By such design, the track width can be made substantially large, or the coder diameter or, if the coder is of the rectilinear type, its width can be reduced as desired. In addition, since the possibility of ambiguous sensing at the time of transition from one code to another can be effectively eliminated by the use of an appropriate logic circuit, the design does not require any particularly high accuracy in fabrication and in brush arrangement except for the least significant place or coder stage.

Consideration will next be given relative to the least significant place. As pointed out hereinbefore, the number which a signal output from the coder plate at any place is intended to transmit cannot be identified unless the output in the next lower place is established. This implies that the transition from one number to another in any coder stage depends upon that in the least significant place. It follows, therefore, that the least significant place should be fabricated primarily to the effect that the signal transition takes place at equal intervals.

It will be desirable from the economical standpoint if the same form of logical circuit can be employed for any place including the least significant to discriminate between two adjacent numbers. As set forth hereinbefore, the condition 6′ or 6″ should be observed in the least significant place. This indicates that the transition from one number to another occurs at all times along one edge of the brushes and hence that the brush alignment accounts for the accuracy in time of transition. Conventional Gray codes, however, as distinct from the code representation of the present information, have no uniqueness in significance, as the transition from one number to another takes place along one or the other edge of the brushes depending upon whether the number of "1" bits increases or decreases at such transition because of the brush width.

One example of 3-number decimal analog-to-digital converter employing the above set of 5-bit decimal codes will next be described with reference to FIGS. 17 to 20. This embodiment employs, in place of coder plate and brush combinations, combinations of a lamp, a coder plate with slots or apertures, and solar cells. FIG. 17 illustrates such coder plate for one decimal place which produces 10 coded signals corresponding decimal digits in one revolution. It is formed with an aperture 2′ which corresponds to the conducting region shown in FIG. 16. The light passing through the aperture impinges upon solar cells not shown but arranged beneath the slots 4′ in FIG. 18 to produce coded signals. As shown in FIG. 19, three of such coder plates 1, 1′ and 1″ are interconnected through speed reduction units including gears 5 and 5′ so as to rotate at reduced speeds, N r.p.m., $N/10$ r.p.m. and $N/100$ r.p.m., respectively, as illustrated in FIG. 19. Light-receiving sections fixedly arranged opposite to the respective coder plates each include five solar cells 6, as shown.

Referring to FIG. 20, there is shown a logical circuitry for use in an analog to digital signal converter constituted in such a manner as described above in which from a coded signal thus sensed out the corresponding decimal digit is determined.

In FIG. 20, $a^1$, $b^1$, $c^1$, $d^1$, and $e^1$, and $a^2$, $b^2$, $c^2$, $d^2$, and $e^2$ indicate the corresponding bits of coded signals sensed out from the coder plates 1 and 1'. A logical circuit for a coded signal which is sensed out from the coder plate 1'' is the same as that for the coder plate 1', which is, therefore, not shown. $m^1$ and $m^2$ indicate carry signals. In the illustrated logic circuit device, the operation for the least significant place (corresponding to $a^1$, $b^1$, $c^1$, $d^1$, and $e^1$) is the same as that in FIG. 6, and also the operation for the next higher place (corresponding to $a^2$, $b^2$, $c^2$, $d^2$, and $e^2$) is similar to that in FIG. 14. Since no carry signal is required for the least significant place no logic circuit for the carry signal is provided in the least significant place. However, by providing such a logic circuit in the least significant place a predetermined signal composed of "1'" or "0" can be entered thereto as the carry signal from the next lower place. If thus constituted, the arrangement of the logic circuit for each place can be made in the same manner.

In the embodiment shown in FIG. 19, each of the solar cells 6 gives an output such as shown in FIG. 21A. This output can be transformed with ease into the form shown in FIG. 21B by clipper and amplifier means or by directing it through a Schmitt circuit. It will be noted that the input to the solar cell is shifted in phase from its output by one-fifth of one complete revolution of the coder plate.

The inventive code system has an important practical advantage that the light-receiving and intercepting intervals can be arranged with an extraordinarily ample tolerance except for the least significant place, as will become apparent from the following consideration: The five solar cells in each decimal place will conveniently be indicated by respective characters *a*, *b*, *c*, *d* and *e*.

Let one complete revolution of the coder plate be represented quantitatively by 100%. Then, the conditions that the ON and OFF intervals in each cell output be arranged accurately in the proportion of 30%:20%:10%:40%, as illustrated in FIG. 20C, and that the cells *a*, *b*, *c*, *d* and *e* be arranged with a phase difference of 20% therebetween may not be necessarily satisfied strictly. That is, the proportion of the "ON" and "OFF" intervals may be in the range of 32–36%:18–14%:12–16%:38–34%, as indicated in FIG. 21D, and the phase difference between the cell outputs may deviate from 20% by 1 to 2%. After all, only absolute requirements to be met in this coder system are that at any moment two or three of the solar cells are receiving light to represent "1," that is, the number of solar cells receiving light is never to be reduced to one or none or increased to four or more, and that three of the solar cells are receiving light at all times when a carry signal arrives from the next lower place. Under such conditions, it has been found that the manufacture or assembling of the coder system can be carried out with extreme ease even with some instability in accuracy of the signal transformation from FIG. 21A to FIG. 21B or with the backlash normally unavoidable in the gearing interconnecting the coder plates. As for the least significant place, where the accuracy in pattern is required, the cells are arranged with a phase difference of 20% therebetween and the points of transition from light reception to interception are arranged as accurately as possible in the proportion of 30%:70%, as shown in FIG. 21E, or alternatively, the points of transition from light interception to reception are arranged as accurately as possible in the proportion of 50%:50%, as shown in FIG. 21F. With such arrangement, it will be noted that an equally divided code pattern can be obtained by means of logics for causing the transition from one number to another at the points of transition arranged accurately.

Further, it will be apparent that analog-to-digital conversion for any multiple-coded decimal notation can also be performed by forming on a single coder plate tracks for a plurality of decimal places.

For example, in cases where such converter employs a coder plate and brush combination, the size of the brush holders can be selected with a substantial degree of freedom since in any decimal place the brushes are only required to lie in a predetermined phase relation to each other. FIG. 22 illustrates a coder plate for analog-to-digital conversion one revolution of which is divided equally into 10 and 100 parts, and FIG. 23 illustrates a slit plate to be placed over the solar cells for cooperation with the coder plate. The construction and operation of logic circuits of the analog to digital signal converter which is constituted by such coder plate and slit plate are similar to those logic circuits described hereinabove.

It will be obvious that many other modes of division may be realized as desired; for example, a coder plate may be designed to include 20 or 40 equally divided parts for one revolution.

Though previously in the general description of the inventive code system both $a_i$ and $a_{i+1/2}$ have been regarded as corresponding to only one particular pattern or code, the code system may include a number of codes each representing *i* with the intention of obtaining a coder with an additional function of error correction.

Assuming a set of codes $A_i$ in place of $a_i$ and representing a pattern included in $A_i$ by $a_i$, $k$, in which $0 \leq k < k_i$, $k_i$ representing the total number of patterns included in $A_i$, $$a_{i;p} \neq a_{i.q} : (i \neq j,\ 0 \leq p < k_i,\ 0 \leq q < k_j)$$
$$a_{i;p} \neq a_{i.q} : (0 \leq p < k_i,\ 0 \leq q < k_i,\ p \neq q)$$
$$\left.\begin{array}{l} a_{i;p} \oplus \tilde{a}_{i+1},\ q \epsilon (A_i + A_{i+1/2}) \\ a_{i;p} \oplus a_{i+1},\ q \epsilon A_{i+1/2} \\ \tilde{a}_{i;p} \oplus a_{i+1},\ q \epsilon (A_{i+1/2} + A_{i+1}) \end{array}\right\} \begin{array}{l} 0 \leq p < k \\ 0 < q < k \end{array}$$

where $\epsilon$ indicates that the part on its left-hand side is included in the code set on its right-hand side. These formulae represent conditions to replace the Formulae 2, 3 and 4 disclosed hereinbefore.

One example of such code set, 6-bit ternary notation follows:

$A_0$: 000001, 000010, 000011

$A_{0+1/2}$: 001111, 001101, 001110, 001011, 001001, 001010, 000111, 000101, 000110

$A_1$: 001000, 000100, 001100

$A_{1+1/2}$: 11110, 110100, 111000, 101100, 100100, 101000, 011100, 010100, 011000

$A_2$: 100000, 010000, 110000

$A_{2+1/2}$: 110011, 010011, 100011, 110010, 010010, 100010, 110001, 010001, 100001

With such code set, the condition that the lack of any one "1" in the code causes no error can be met by the the use of a coder plate carrying that one of the codes which includes the largest number of "1" bits. In usual cases where a coder plate and brush combination is employed, it is thought that the chances of the "1"bit being erroneously repersented as a "0" bit cannot be always avoided. Such error, however, can be automatically corrected by the use of the above code system having an error-correcting ability.

Consideration will next be given to a set of codes usable in the least significant place, for example, as main codes, and which is particular in character. As pointed out hereinbefore, $a_{i+1/2}$ in the least significant place can be taken as $a_i$ or $a_{i+1}$. Accordingly, it is understood that $A_{i+1/2}$ can be dealt with at all times as $A_i$ or $A_{i+1}$:

To summarize, the present invention employs a coder pattern of particular design including main and subcodes, which forms logics corresponding to an extension of the conventional Gray code system. The analog-to-digital converter of the present invention has different advantageous features highly valuable in practical applications. Firstly, because of the use of sub-codes, the coder pattern can be formed with a considerably ample tolerance even in cases it includes a number of coder plates for respective decimal places. Secondly, adjustment in position of brushes or other sensing means can be made with ease. Thirdly, with coder plates interconnected by gear means, the presence of a more or less backlash in the gear train is permissible. Among others, there is no need for incorporating logic circuits for V-brush means in the converter; the number of wires required for transmission of converted signals can be minimized; and use can be made of relatively simple logic circuits for conversion into codes of desired form.

Though a few preferred embodiments of the present invention have been described and shown herein, it is to be understood that it is not to be restricted to the details set forth but many changes and modifications can be made without departing from the spirit and scope of the present invention as obvious to one of ordinary skill in the art.

What is claimed is:

1. An analog to digital signal converter comprising:
at least one coder plate having tracks whose number is less than the number of bits which constitute the digital signal corresponding to an analog signal to be converted, the respective tracks of the coder plate having different patterns consisting of binary code units;
means for sensing a coded signal corresponding to the analog signal applied thereto from positions in the respective tracks of the coder plate, the number of the positions to be sensed being equal to that of bits of the digital signal;
means for moving the coder plate relatively with respect to the sensing means along the tracks in accordance with the analog signal; and
a logic circuit device which comprises: means for receiving the coded signal from the sensing means; NOT circuit means for producing an inverted signal which consists of inverted bits of the coded signal; and AND circuit means for producing the logical product of a predetermined combination which indicates the digital signal of bits of the inverted signal and the coded signal.

2. An analog to digital signal converter comprising:
a plurality of coder plates each relating to a place of $m$-coded notation, each having tracks in which binary code units are constituted so as to indicate $m$ different codes of $n$ bits which constitute the digital signal corresponding to an analog signal to be converted;
means for sensing coded signals of $n$-bits corresponding to the analog signal applied thereto from the respective tracks of each coder plate;
means for causing the coder plate to move relatively with respect to the sensing means along the respective tracks in accordance with the analog signal; and
a logical circuit device which comprises:
means for receiving the coded signals from the sensing means;
NOT circuit means for producing an inverted signal which consists of inverted bits of the coded signal; means for producing a carry signal from the output of the logical circuit;
first AND circuit means for producing the first logical product, of a predetermined combination which indicates main codes, of bits of the inverted signal and the coded signal;

second AND circuit means for producing the second logical product, of a predetermined combination which indicates $m$-different sub-codes, of bits of the inverted signal and the coded signal, the respective sub-codes including $n$-bits which corresponds to the bitwise OR of the respective bits of the two main codes adjoined to each other and being distinguishable from said respective main codes;
third AND circuit means for producing the third logical product of the sub-code signal and a carry signal coming from a next lower place so as to select any one of the two main codes, when the sub-code therebetween is sensed out as the coded signal; and
OR circuit means for producing the logical sum of the first and third logical products.

3. An analog to digital signal converter comprising:
a plurality of coder plates, each relating to a place of decimal notation, each having tracks in which binary code units are constituted so as to indicate ten different 2-out-of-5 codes which constitute the digital signal corresponding to an analog signal to be converted;
means for sensing coded signals of 5-bits corresponding to the analog signal applied thereto from the respective tracks of each coder plate;
means for causing the coder plate to move relatively with respect to the sensing means along the respective tracks in accordance with the analog signal; and a logical circuit device which comprises:
means for receiving the coded signals from the sensing means; NOT circuit means for producing an inverted signal which consists of inverted bits of the coded signal; means for producing a carry signal from the output of the logical circuit;
first AND circuit means for producing the first logical product of a predetermined combination which indicates said 2-out-of-5 codes, of bits of the inverted signal and the coded signal;
second AND circuit means for producing the second logical product of a predetermined combination which indicates ten different 3-out-of-5 codes, of bits of the inverted signal and the coded signal, the respective 3-out-of-5 codes including 5-bits which correspond to the bitwise-OR of the respective bits of the two 2-out-of-5 codes adjoined to each other and being distinguishable from said respective 2-out-of-5 codes;
third AND circuit means for producing the third logical product of the 3-out-of-5 code signal and a carry signal coming from a next lower place so as to select any one of the two 2-out-of-5 codes, when the 3-out-of-5 code therebetween is sensed out as the coded signal; and
OR circuit means for producing the logical sum of the first and third logical products.

References Cited

UNITED STATES PATENTS

| | | | |
|---|---|---|---|
| 3,268,885 | 8/1966 | Coyle et al. | 340—347 |
| 3,229,280 | 1/1966 | Chapin | 340—347 |
| 3,238,524 | 3/1966 | Oddo et al. | 340—347 |

MAYNARD R. WILBUR, Primary Examiner

MICHAEL K. WOLENSKY, Assistant Examiner